Oct. 6, 1925.
L. A. GUEDEL
1,555,964
BLADE FOR ASPHALT AND THE LIKE MIXERS
Filed Jan. 3, 1925    2 Sheets-Sheet 1
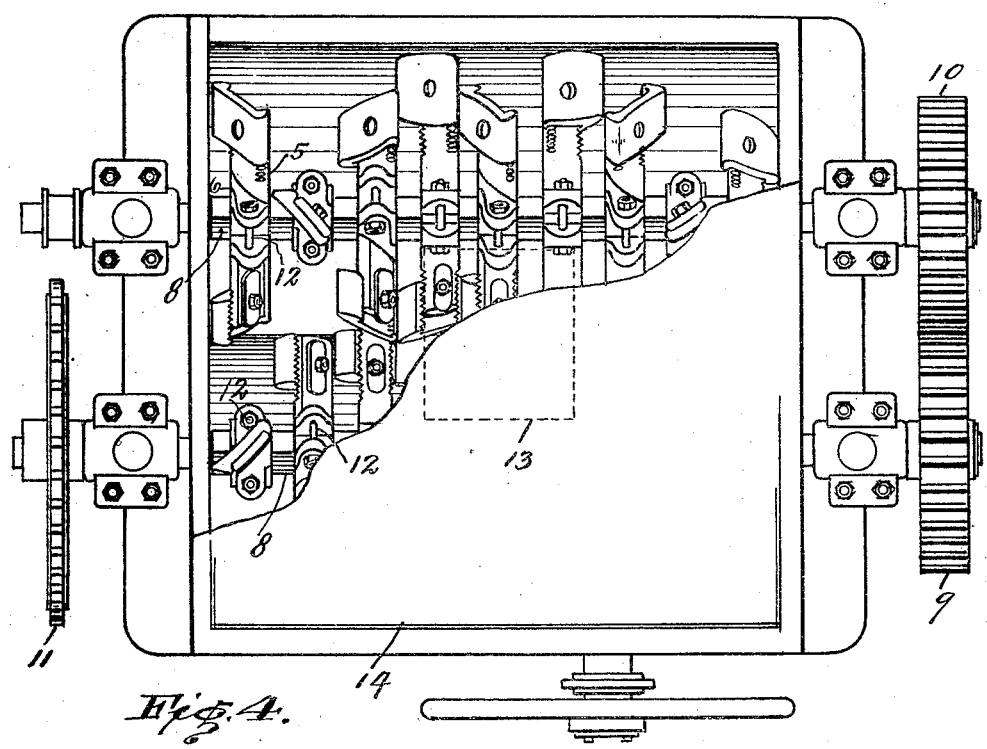
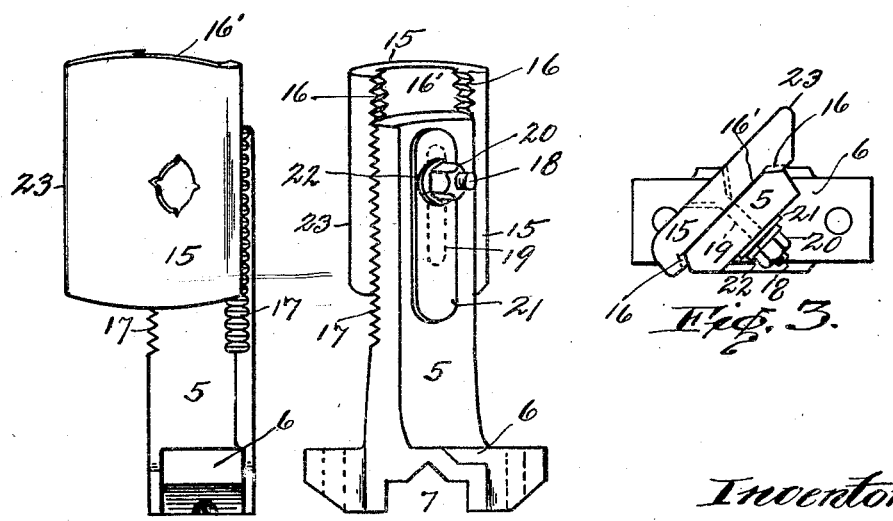
Inventor.
Louis A. Guedel,
By Joseph A. Minturn,
Attorney.

Oct. 6, 1925.
L. A. GUEDEL
1,555,964
BLADE FOR ASPHALT AND THE LIKE MIXERS
Filed Jan. 3, 1925    2 Sheets-Sheet 2
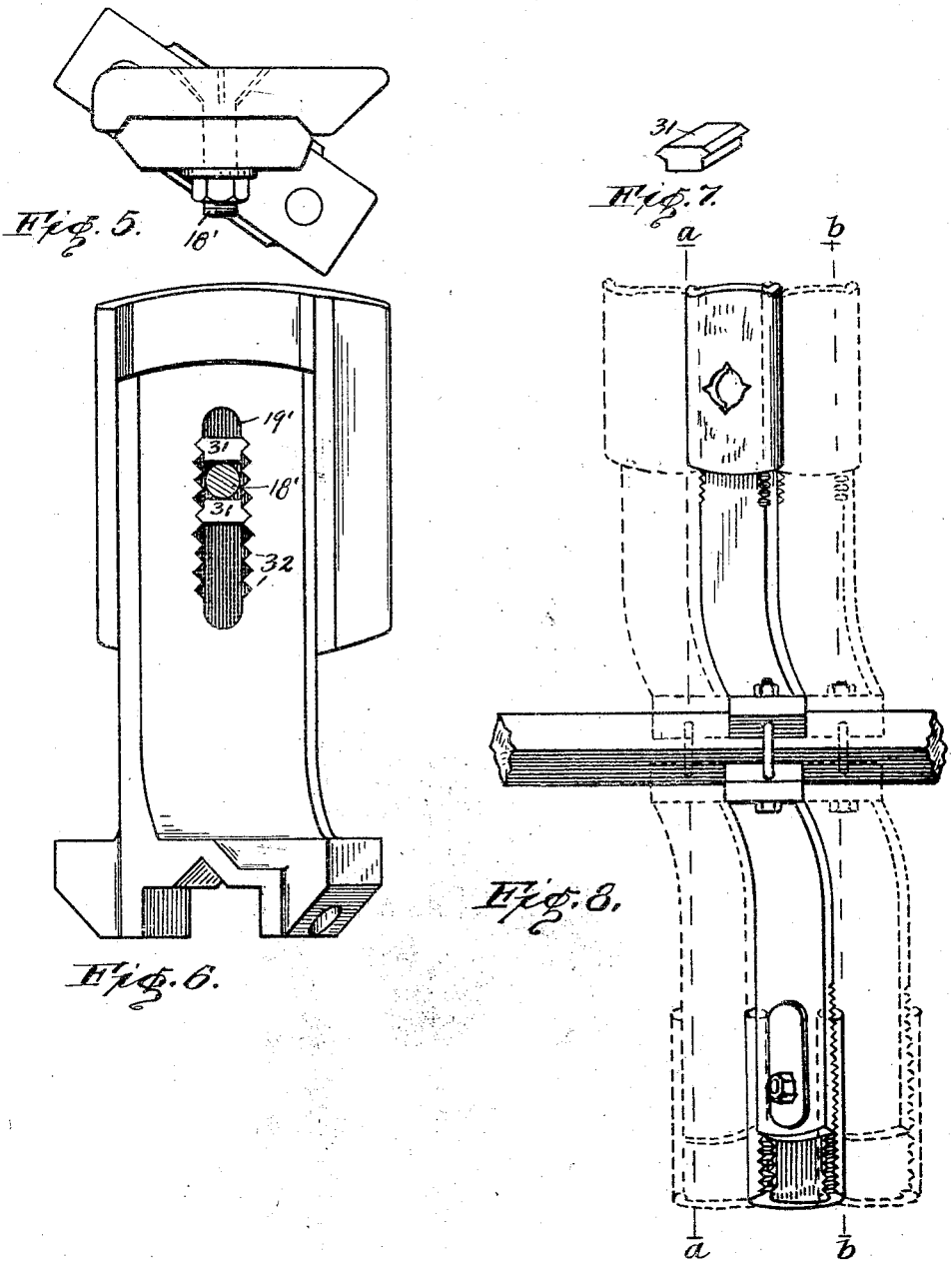

Patented Oct. 6, 1925.

1,555,964

UNITED STATES PATENT OFFICE.

LOUIS A. GUEDEL, OF INDIANAPOLIS, INDIANA, ASSIGNOR TO HETHERINGTON AND BERNER, OF INDIANAPOLIS, INDIANA, A CORPORATION OF INDIANA.

BLADE FOR ASPHALT AND THE LIKE MIXERS.

Application filed January 3, 1925. Serial No. 440.

*To all whom it may concern:*

Be it known that I, LOUIS A. GUEDEL, a citizen of the United States, residing at Indianapolis, in the county of Marion and State of Indiana, have invented a new and useful Improvement in Blades for Asphalt and the like Mixers, of which the following is a specification.

This invention relates to blades for machines for mixing various materials and was particularly designed for blades of machines for mixing asphalt, in a heated condition, preliminary to laying it as a surface for roadways, but my invention is applicable to machines for mixing clay and other materials and I therefore do not desire to limit its use to asphalt mixers.

The object of the invention is, first, to provide a blade with an adjustable outer end of very hard slow wearing metal, whereby the wear will be slow, and, whereby, by reason of the adjustment, the end may be moved outwardly longitudinally of the blade to compensate for such end-wear as must occur, and by means of such adjustment to provide means for maintaining a uniform length of the blade terminating so close to the housing or container that no deposit of unmixed material can accumulate next to the container; a second object of my invention is to make the adjustable blade-end reversible in order thereby to subject both portions to wear and double the life of the blade-end; a third object is to extend the lateral dimensions of the blade-end into such close operating relation to the next adjacent blade ends that the entire interior surface of the container will be raked by the blades and the formation of ridges of material adherent to the container walls will be prevented.

I accomplish the above and other minor objects which will hereinafter appear, by the mechanism illustrated in the accompanying drawings, in which—

Fig. 1 is a front elevation of a mixer blade and adjustable end embodying my invention; Fig. 2 is a side elevation of same; Fig. 3 a plan view looking at the outer end of the blade. Fig. 4 is a plan view of a mixing machine with the top broken away to show, within, an assembly of mixer-blades of my invention. Fig. 5 is an outer end view, and Fig. 6 a side elevation, of a modified blade and adjustable end member. Fig. 7 is a perspective view of a stop block used in the device illustrated in Fig. 6, and Fig. 8 is a diagrammatic view of a modified blade and hub structure to avoid leaving ridges in the container without widening the end member.

Like characters of reference indicate like parts in the several views of the drawings.

The blades 5 are radial to and integral with a hub-half 6. The hub-half has a recess 7 on its opposite side from the blade, in a manner as shown, to fit a square shaft 8 (see Fig. 4). The angular shape of the recess 7 is such that it will fit the square shaft in two blade-positions 45° apart, thereby providing for hub adjustments which will present eight blades 45° apart in a spiral circuit of the shaft. The blades stand obliquely to their hub-members in the plane of said spiral, and their ends are correspondingly placed to secure a screw-action of the series to move the asphalt mass toward a discharge opening.

In the assembly shown in Fig. 4, a pair of shafts 8 are mounted parallel with each other, and are geared together by the cog-wheels 9 and 10. Power is applied by means, not shown, to a sprocket wheel 11 on one of the shafts. The hub-halves have holes for bolts 12, 12, by which a pair of hub-halves oppositely assembled on a shaft 8, are clamped together and to the shaft. A discharge opening 13, shown by dotted lines in Fig. 4, is located centrally of the container 14, and the blades on each shaft from one end to opening 13, are oppositely oblique to the blades from the other end of the shaft to said opening, thereby to feed the mixed material from both ends of the container to the discharge opening.

The blades 5 are of common cast-iron, unchilled and unannealed. They lack considerably of being long enough to mix the material adjacent to the walls of the container, and the length required is supplied by removable and adjustable end-members 15, formed out of chilled cast iron, and the ends are, therefore, very hard and slow wearing. Each member 15 has a channel 16' on one side to receive the blade 5, and the sides of the recess are here shown as oblique to fit correspondingly oblique portions of the blade, and the oblique formations of member 15 and blade 5 are provided with serrations 16 and 17, respectively, which interlock in an assembly, to prevent movement of the member 15 on blade 5. The member 15 has a countersunk bolt-hole for the passage of a bolt 18, and has formations to secure and hold the head of the bolt against rotation of the bolt. The bolt passes, also, through a slot 19, formed longitudinally in the blade 5, and a nut 20 on the threaded end of the bolt provides means for fastening the member 15 to the blade. The slot 19 is long enough to allow for all desired adjustments on the blade of the member 15; and to keep the material being mixed from fouling the slot I prefer to cover it with a plate 21 having a hole for the passage of the bolt. A spring-washer 22 is preferably used between the nut and the plate to lock the nut.

The member 15 has an extension 23 on one side to reach across to the path of the next blade-end on that side, to rake the container clean between the blades and prevent the formation of ridges adherent to the container walls.

From the foregoing description it is obvious that the end member 15 can be adjusted longitudinally of the blade 5, by loosening the nut 20, so the serrations of the two members will clear each other, and then bolting the members together again in their new positions.

When one end of member 15 is so far worn as to make the operation desirable, the member 15 can be reversed to bring the inner end outermost, and when both ends are so worn as to require complete renewal, only the member 15 is replaced by a new one, which is done at a nominal cost for chilled white iron.

In the modification shown in Figs. 5 to 7, inclusive, the previously described interlocking serrations are omitted and a pair of movable lock-bars 31, 31, one on each side of the bolt 18', are inserted in the slot 19'. The sides of slot 19' have notches 32 which receive and hold the ends of the bars. The ends and the notches are here shown as V-shape but they may be otherwise shaped. The pointed ends of the bars are at one side of the middle plane to form a half-bar that may be made to project in opposite directions from a line connecting the suspension points, by reversing the bar, to correspondingly vary the contact of the bar with the bolt 18', and a finer adjustment of the end member may thereby be secured.

In Fig. 8 the mixer blade is so off-set from the hub-bolt, in opposite directions for each pair of blades of the same hub, that the paths of the two blades of that pair overlap in a combined path extending from line *a* to line *b*, and rake the container clean without forming the end member with an extension 23, as previously described. The paths of the next adjacent blade-pairs are shown by dotted lines on each side of the pair shown in full lines, and it will be noted that the paths of the end members so interlap as to rake all of the curved inner wall of the container 14 without the extensions 23. As a result the narrower heads meet with less resistance from the asphalt mixture and less power is required to operate the mixer. Also the mixture contacts with more blades and is thereby more thoroughly agitated.

It is obvious that other interlocking means than here shown, may be used between the adjustable members, and that the shapes and proportions of the members and their fastening means may be varied without departing from the spirit of my invention and I therefore do not desire to be limited to the construction shown, nor any more than as required by the appended claims, and having thus fully described my invention, what I claim, is:

1. The combination with a mixer blade, of a separate outer end member therefor having a channel with outwardly oblique sides in which the blade is received said blade having beveled corners to fit the oblique sides of the channel, a bolt seated in one of the members and passing through a slot in the other and means on the bolt to draw the oblique portions into wedging engagement.

2. The combination with a mixer blade, of a separate outer end member therefor having a channel with outwardly oblique sides in which the blade is received said blade having beveled corners to fit the oblique sides of the channel, a bolt seated in one of the members and passing through a slot in the other a nut on the bolt and means in the slot to lock the end member at a given position on the blade.

3. The combination with a mixer blade, of a separate outer end member therefor having means to hold the end member from rotation relative to the blade, and means to hold the end member from movement longitudinally of the blade comprising a bolt seated in one of the members and passing through a slot in the other member, a nut on the bolt and means in the slot to lock the bolt at a given positions comprising stop bars on each side of the bolt, adjustably anchored in the slot.

4. In a mixer, a pair of diametrically opposite mixer blades offset in opposite directions and in the direction of their axis of rotation to overlap the paths of said blades the pitch of both blades being in the same direction to move the product in the same direction.

Signed at Indianapolis, county of Marion, State of Indiana, this the 18th day of December, 1924.

LOUIS A. GUEDEL.